US 6,631,910 B2

(12) United States Patent
Caplain et al.

(10) Patent No.: US 6,631,910 B2
(45) Date of Patent: Oct. 14, 2003

(54) ELASTIC METAL GASKET WITH OFFSET PROJECTING PARTS

(75) Inventors: Philippe Caplain, Saint Paul Trois Chateaux (FR); Laurent Mirabel, Pierrelatte (FR); Christian Rouaud, Bourg Saint Andéol (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/989,170

(22) Filed: Nov. 21, 2001

(65) Prior Publication Data

US 2002/0153673 A1 Oct. 24, 2002

(30) Foreign Application Priority Data

Apr. 23, 2001 (FR) .............................. 01 05426

(51) Int. Cl.⁷ ................................ F16J 15/02
(52) U.S. Cl. ................ 277/644; 277/611; 277/612; 277/626; 277/647
(58) Field of Search ................ 277/602, 608, 277/612, 626, 611, 647

(56) References Cited

U.S. PATENT DOCUMENTS

| 2,547,185 A | * | 4/1951 | Von Bolhar | ............... | 286/11 |
| 2,631,908 A | * | 3/1953 | Teetor | ............... | 277/462 |
| 3,184,246 A | * | 5/1965 | Kline | ............... | 277/168 |
| 3,758,123 A | * | 9/1973 | Ksieski | ............... | 277/206 |
| 4,561,662 A | * | 12/1985 | de Villepoix et al. | ............ | 277/229 |
| 5,022,663 A | * | 6/1991 | Fages et al. | ............ | 277/236 |
| 5,238,136 A | * | 8/1993 | Kasugai et al. | ............ | 220/304 |
| 5,669,612 A | * | 9/1997 | Nicholson | ............ | 277/614 |
| 5,797,604 A | | 8/1998 | Inagaki et al. | | |
| 6,161,841 A | * | 12/2000 | Shaw | ............ | 277/642 |
| 6,286,839 B1 | * | 9/2001 | Mitsui et al. | ............ | 277/603 |
| 6,357,760 B1 | * | 3/2002 | Doyle | ............ | 277/604 |
| 6,409,180 B1 | * | 6/2002 | Spence et al. | ............ | 277/608 |

FOREIGN PATENT DOCUMENTS

| FR | 2636115 | 3/1990 |
| WO | WO 00/57089 | 9/2000 |

* cited by examiner

*Primary Examiner*—Anthony Knight
*Assistant Examiner*—Lisa Bannapradist
(74) *Attorney, Agent, or Firm*—Thelen Reid & Priest LLP; Robert E. Krebs

(57) ABSTRACT

The open circular section gasket is not deformed under flattening while nevertheless ensuring the leaktightness of the two spaces to seal.

Each contact surface (16) is slightly inclined and has a slightly offset projecting part (15) such that the summits of the two projecting parts define an axis that is offset with respect to the center line (A2) of the general circular shape of the gasket (10). When the gasket is flattened, the contact surfaces (16) tend to become parallel, the projecting parts (15) come closer to the center line (A2).

Application to cases of static sealing.

14 Claims, 5 Drawing Sheets

ELASTIC METAL GASKET WITH OFFSET PROJECTING PARTS

CROSS-REFERENCE TO RELATED APPLICATION

This application claims priority based on French Patent Application No. 01/05426, filed on Apr. 23, 2001.

SCOPE OF INVENTION

The invention relates to the domain of static sealing, notably the elastic metal gasket that must provide a seal with a preload less than that necessary to ensure the efficiency of a gasket with a spring core.

PREVIOUS TECHNIQUE AND PROBLEM AT HAND

In view of their insensitivity to corrosive fluid, their good behavior at high and low temperatures and their good resistance over time, metal gaskets are used for a variety of applications, among which can be cited, in a non-limiting manner, the chemical, petroleum and nuclear industries, as well as the automotive and aerospace sectors. The quality of the seal provided by a gasket depends notably on the specific pressure developed between the contact surfaces of the gasket and the flanges of the assembly in which the gasket is placed. During the initial tightening of the assembly, the specific pressure must be sufficient to allow the adaptation of the gasket to the surface irregularities of the flanges. It is thus clear that the specific pressure of the tightening must be relatively high, in any event, greater than the pressure of the fluid found inside the volume delimited by the gasket and the surfaces of the tightening flanges.

Furthermore, in many applications, the preload must remain low. This is notably the case when the assembly is not very accessible, thus making the handling of tightening tools difficult such as in the nuclear industry and when the assemblies made of high-characteristic materials must be lightened and cannot withstand significant preload, as in the aerospace and space industries. To achieve such a result, metal o-ring gaskets have been developed. Their elastic element is an open tube, preferably sheathed in a thin layer of ductile material. Each contact surface has a part that projects in the axis of reaction of the gasket with respect to the surfaces of the tightening flange. This reduces preload by a factor of 2 on this type of gasket. The US patent, U.S. Pat. No. 3,188,100 can be cited to this effect. The principles and disadvantages of the operation of the gasket described in the U.S. Pat. No. 3,188,100 patent are explained in reference to FIGS. 1 and 2.

In reference to FIG. 1, showing a cross-section of the gasket described in the American patent, it is observed that the gasket has a ring shape with its section forming a revolution. On the other hand, the latter is open by an opening 2 placed on the inside of the gasket. It is composed of two parts which are a metal core 3 around which is placed a softer external layer 4. The assembly is machined or deformed on the parts that will be in contact with the parts to seal so as to form two projecting parts 5 projecting over a flat surface 6 on either side of the gasket. These two projecting parts 5 are thus designed to come in contact with the two surfaces that the gasket will be in contact with and to be partially flattened against them.

The choice of a general open tube structure does not simultaneously satisfy the criteria of low stiffness of the whole and high leaktightness despite the presence of the projecting parts 5. Indeed, the open tube structure leads to an asymmetrical deformation of the gasket section during flattening and, as a result, to a deterioration of the seal generated by the displacement of the projecting parts 5 as shown in FIG. 2.

On this figure, points C1 and C2 indicate the two contact locations of a projecting part respectively before and after flattening. Gasket 1 was represented in contact with two surfaces that delimit the two spaces to be sealed and which come together when flattened. A displacement of Δa of location C1 with respect to location C2 of the contact point occurs. It can even be observed that when gasket 1 is flattened, the extremities 7 of the open structure formed by gasket 1 come together slightly and shift towards the outside. In other words, if the initial position of the projecting parts, identified as 5 on FIG. 1, is found in the center of the geometric structure of the gasket, as point C1, point C2 representing the positioning of the projecting parts, after gasket 1 is flattened, this position is no longer in the center but on one side. The shift of the axis of the section of the gasket is thus prejudicial to achieving the desired seal. In such a gasket, the best sealing level possible is achieved during flattening and not at the end of the flattening operation as is sought by the users. It is even possible to note a deterioration of the seal during flattening.

The French patents FR-2 557 662 and FR-2 636 115 each describe a type of metal o-ring gasket whose core is composed of a helical spring and which has two projecting parts machined on an outside sheath. The choice of a helical spring to form the central core of the gasket does not enable the preload to be decreased below a certain threshold since there is a very high risk of flipping of the turns of the spring and consequently a random reaction of the spring on the sealing surface.

The aim of the invention is to remedy this inconvenience by proposing another type of elastic metal gasket with projecting parts.

SUMMARY OF THE INVENTION

To this effect, the main object of the invention is an elastic metal gasket including an elastic metal core and an external metal sheath in which the elastic metal core is encased and which, when the gasket is idle, presents an open circular type section, defining a center line, that is a line passing through the geometric center of the idle section, the opening of the general structure of the gasket being found between two opposite contact surfaces each having a projecting part, whose summit is designed to come in sealed contact with an object under a determined preload.

According to the invention, when idle, the projecting parts are slightly offset on the same side with respect to the center line such that they come closer to this center line under the effect of preload.

Preferably, the projecting parts are equidistant from the opening of the structure of the gasket.

In the preferential execution of the seal according to the invention, the two contact surfaces are each perpendicular to an axis of symmetry of its related projecting part whose axis of symmetry passes through the center of the circle defined by the circular section of the gasket.

In this case of the preferential execution of the seal according to the invention, when the gasket is idle, each contact surface is inclined at a determined angle with respect to the positioning plane defined by the summit of the projecting part, when it is triangular in shape, and the extremity of the surface found closest to the opening.

In a great many executions of the seal according to the invention, the gasket is generally ring-shaped. In other executions of the seal according to the invention the gasket may be elliptical, rectangular, generally rectangular with rounded corners, triangular or another of the representative shapes shown in FIGS. 8–10.

Preferably, the height of the projecting parts falls between 0.05 and 0.15 mm. For an approximately triangular section the height is measured between the summit of the projecting part and the contact surface of the external metal sheath. In other executions of the seal according to the invention the projecting part may be elliptical, rectangular, generally rectangular with rounded corners, triangular or another of the representative shapes show in FIGS. 11–14. For an approximately trapezoidal section, rounded section or other shaped section, the height is measured perpendicular to the contact surface of the external metal sheath at the summit of the projecting part.

LIST OF FIGURES

The invention and its various characteristics are better described if the following description is read in reference to several figures representing respectively:

FIG. 1, a metal gasket according to an earlier technique;

FIG. 2, the behavior of the metal gasket according to the earlier technique in operation;

FIG. 3, the operating principle of the elastic metal gasket according to the invention;

FIG. 4, the elastic metal gasket according to the invention;

FIGS. 5 and 6, two curves relating to the proper operation of the elastic metal gasket according to the invention.

DETAILED DESCRIPTION OF A MODE OF EXECUTION OF THE INVENTION

Figure 1:
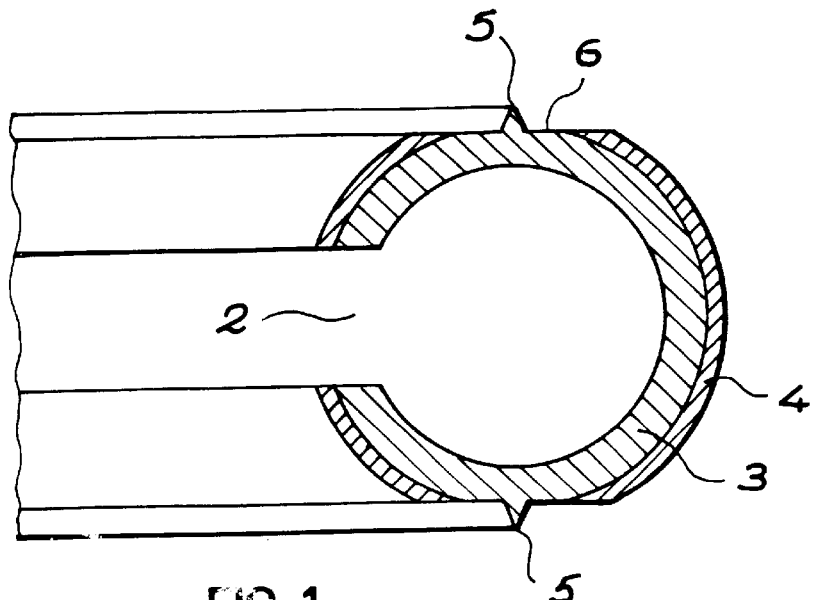
Figure 2:
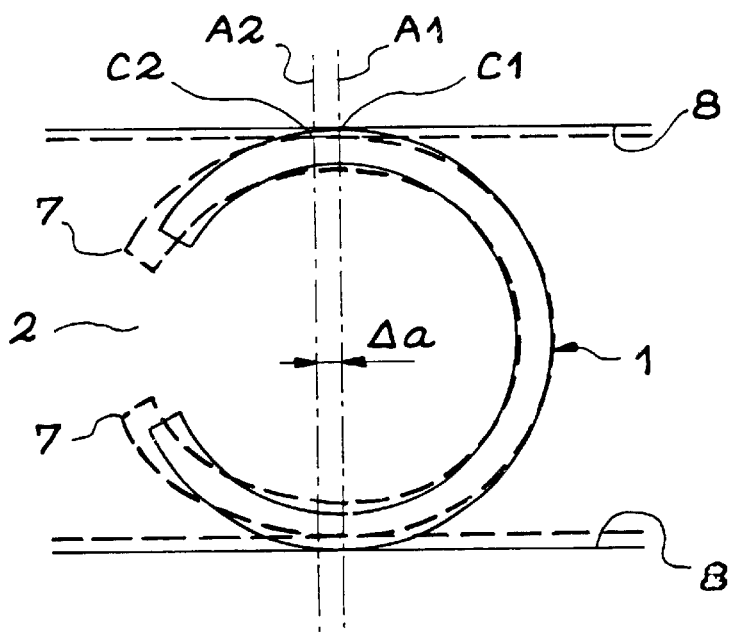
Figure 3:
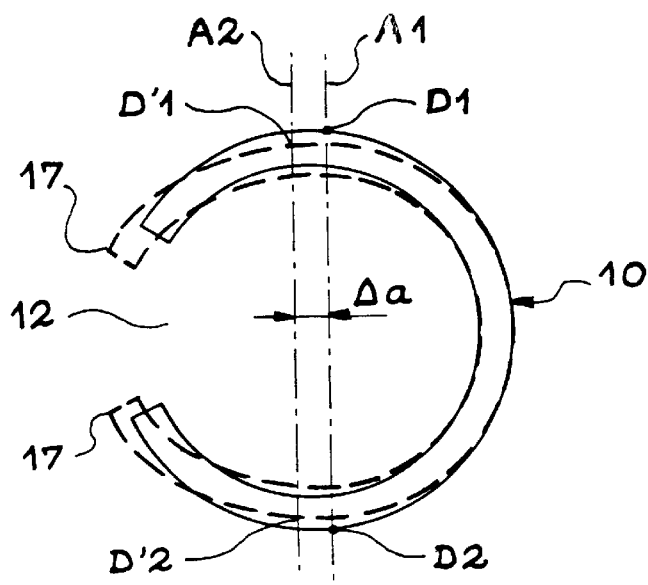

In reference to FIG. 3, the operation of the gasket according to the invention is based on a principle similar to the gasket of an earlier technique mentioned in the American document, with, however, a preponderant difference which is the following.

Gasket 10 has an open cylindrical structure with an opening 12. On the clearance surface that will come into contact with the objects to seal, one with respect to the other, it has a projecting part. The latter is placed at a location, identified D1 or D2, that is slightly offset with respect to the center line A2 of gasket 10, which passes through the geometric center of the section of gasket 10. In other words, there is a short distance Δα between line A1 passing through the two contact points D1 and D2, each forming a projecting part and the center line A2 of gasket 10.

In this way, in the figure showing the oppositions before and after flattening, we see that gasket 10 shifts slightly to the left, as shown by the change in position of the extremities 17 of gasket 10 with respect to the opening 12. In other words, at the end of the flattening operation, the axis of symmetry of each projecting part should be found at location D'1 or D'2, on or very close to the center line A2 of gasket 10. Consequently, the shifted position, idle, of the projecting parts as symbolized by locations D1 and D2 must be provided for.

Figure 4:
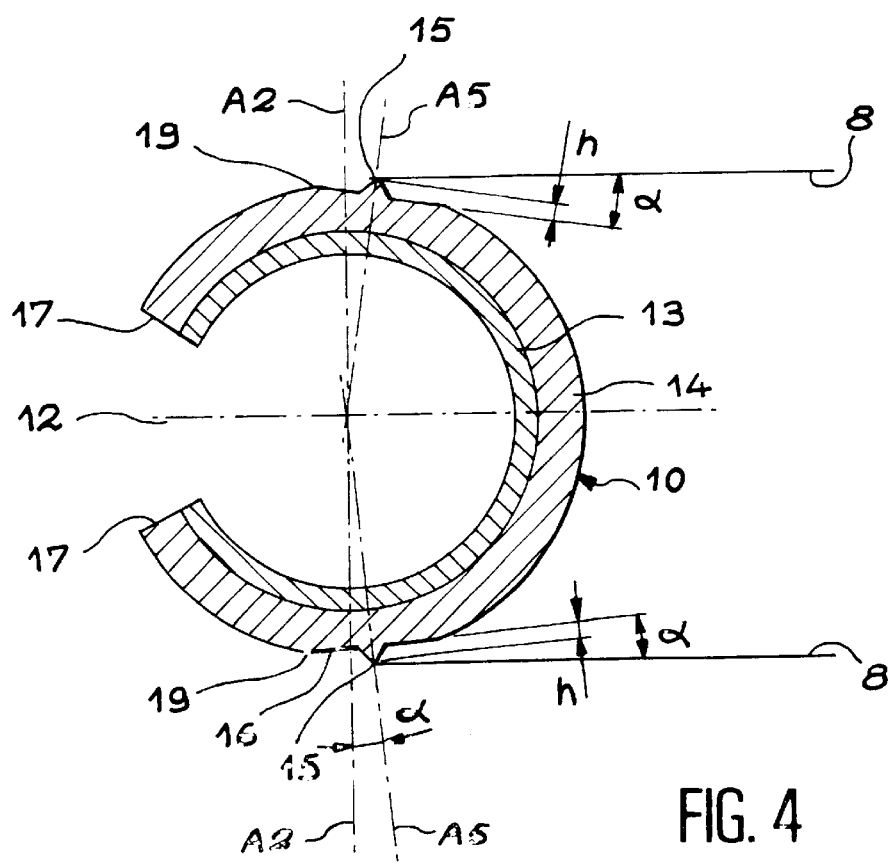

FIG. 4 shows the detail of the preferential execution of a seal according to the invention. It includes a metal core 13 most often made of a material with a high elastic limit such as strain hardened stainless steel, cuproberyllium, nickel or titanium alloys. The external sheath 14 is found around this metal core. It is made of a more ductile material such as for example, aluminum, silver, gold, copper or a like material. In the preferential execution external sheath 14 is one layer. In other executions external sheath 14 may be made of more than one layer of the more ductile material.

There are two smooth clearance surfaces 16 that are nearly diametrically opposed. However, they are not parallel since they are both inclined towards the same side of the same inclination angle α. A projecting part 15 is provided in the center of each clearance surface 16. In the preferential execution, projecting part 15 is triangular in shape. It is envisioned, however, that the projecting part may be trapezoidal, rectangular, elliptical, or combinations and modifications of such shapes. The axis of symmetry A5 of each projecting part 15 is thus found to be inclined with the same angle of inclination α with respect to the vertical and passes through the geometric center of gasket 10.

Due to the incline of the clearance surfaces 16, they can each have an extremity 19 in contact with one of the parts 8 with respect to which the seal must be provided. Thus, by choosing a height h of the projecting parts 15, an angle of inclination a of the clearance surfaces 16 and a length of these clearance surfaces 16, when the gasket is placed before flattening, it is possible to obtain double contact between the gasket and parts 8. Indeed it can be considered that these parts 8 whose surfaces are parallel can each be in contact simultaneously with the summits of a projecting part 15 and an extremity 19 of the corresponding clearance surface 16.

For example, the angle of inclination α must be low and can vary from 1 to 15°. The choice of its exact value is dictated by the dual requirement of obtaining the same optimum seal at the end of tightening and maintaining this same sealing level for the lowest possible force threshold during the decompression phase.

For an aluminum sheath 0.5 mm thick and an outside diameter of 4.2 mm, an angle of inclination α of about 8° can be envisaged, leading to an offset of axes A1 and A2 of FIG. 3 of about 0.30 mm for a height h of 0.1 mm.

Figure 5:
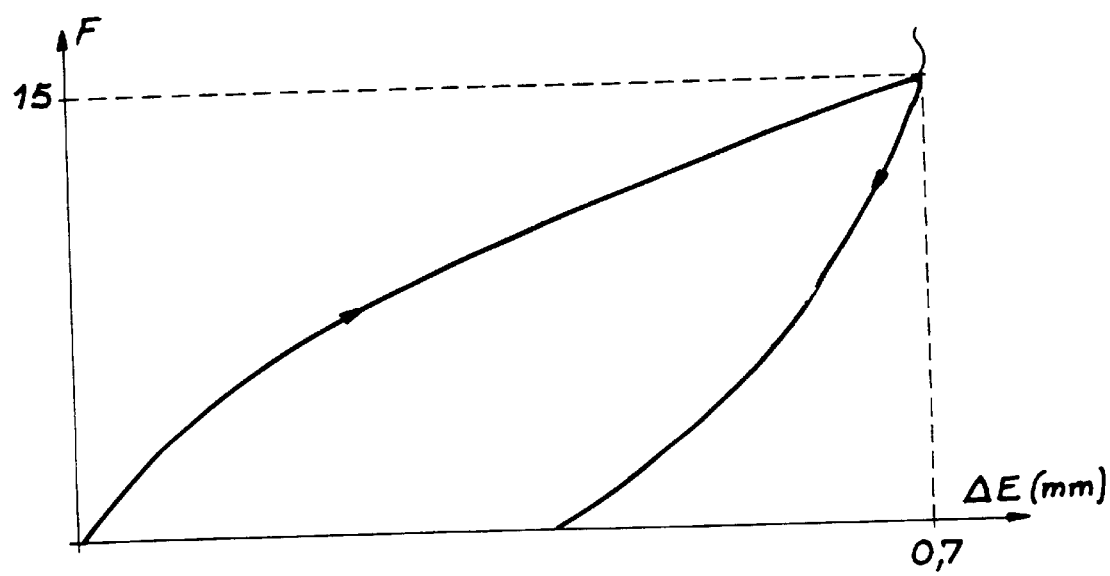

FIG. 5 represents a characteristic curve of the preload F according to flattening ΔE. It is observed that the flattening is more difficult to obtain upon tightening than upon untightening.

Figure 6:
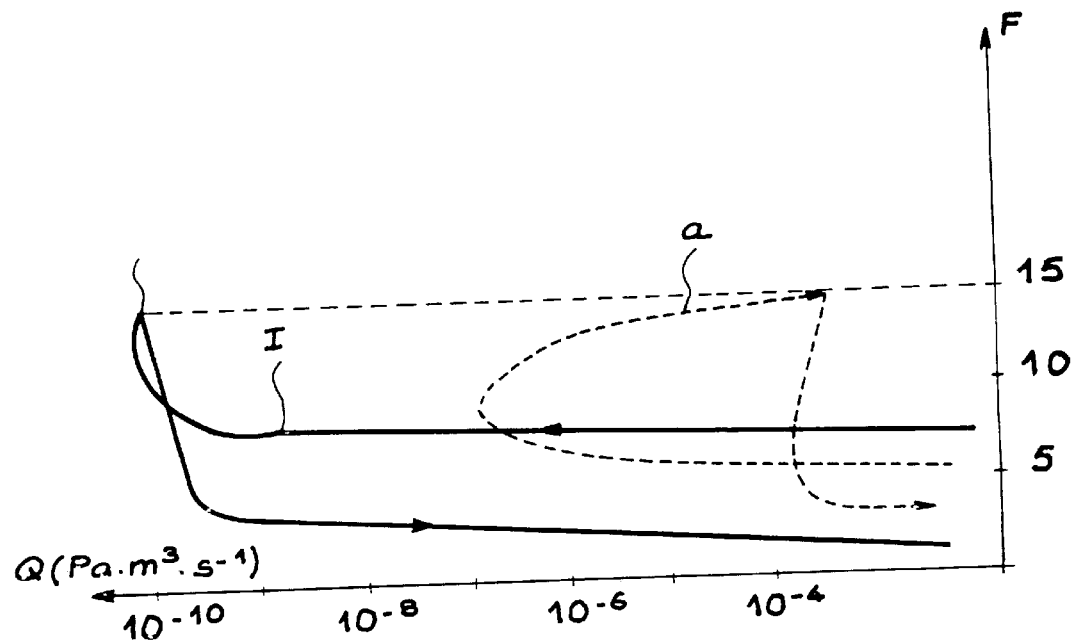
Figure 8:
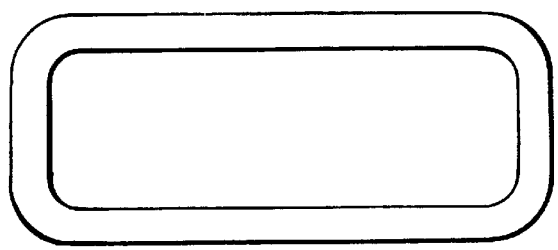
FIGS. 7–10 illustrate gaskets in accordance with other embodiments of the present invention.
Figure 7:
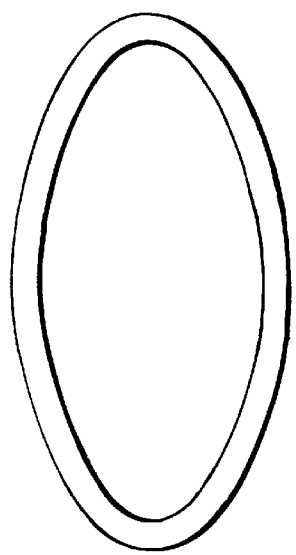
Figure 9:
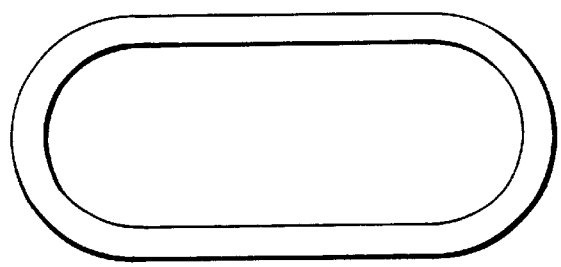
Figure 10:
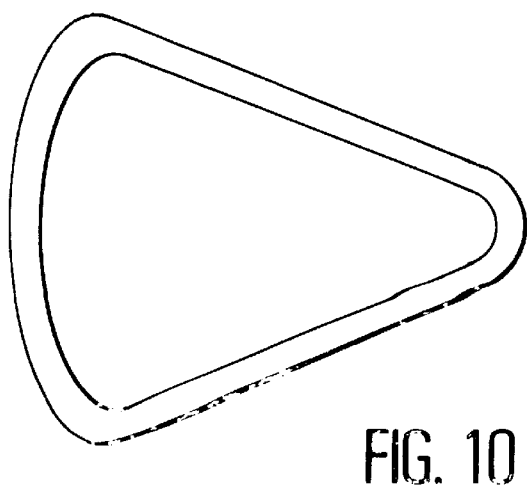
Figure 11:
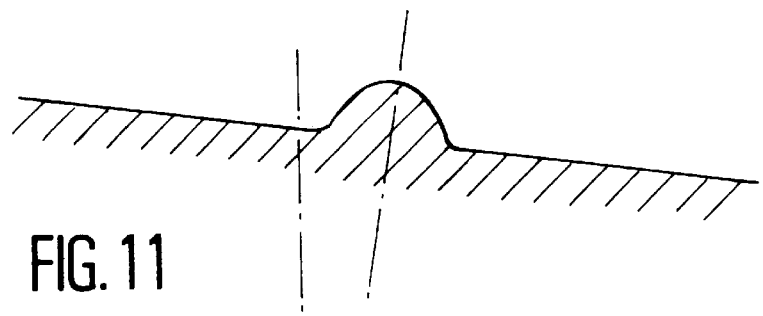
FIGS. 11–14 illustrate projection parts in accordance whit other embodiments of the present invention.
Figure 12:
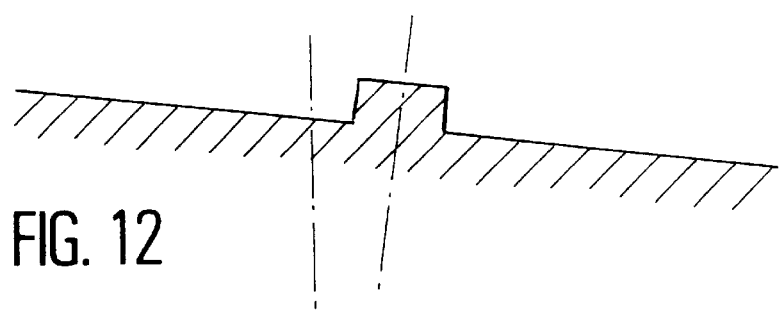
Figure 13:
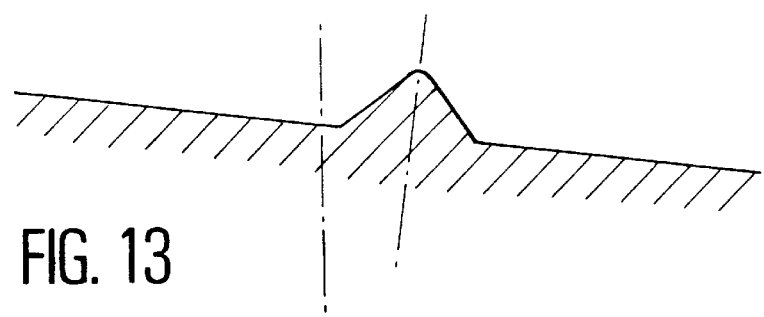
Figure 14:
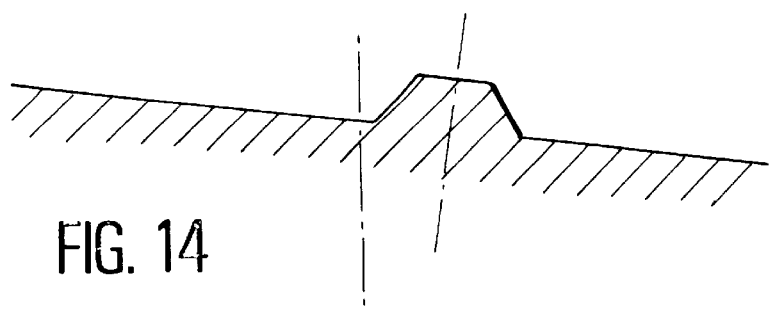

FIG. 6 represents the evolution of the leak value Q during the flattening cycle according to the flattening force. In FIG. 6, we compared the performance of the gasket according to the invention (curve I, full lines) with the performance of a gasket according to an earlier technique, with no offset of the projecting parts (curve A, dotted lines).

We observe that the gasket according to the earlier technique more rapidly achieves a better seal at the beginning of flattening. On the other hand, this seal deteriorates thereafter, in particular when 0.7 mm of flattening is reached for the example considered. Furthermore, the gasket according to the invention for which the angle of inclination α equals 8°, shows a constant improvement of the seal in the compression phase and a very good seal at the end of the flattening operation for the same value of 0.7 mm of flattening. This very good seal varies very little during decompression, up to a force threshold of 4 to 5 newtons per millimeter.

What is claimed is:

1. Elastic metal gasket (10) comprising an elastic metal core and external metal sheath (14), in which the metal core is encased, the gasket (10) presenting, when idle, an open circular section defining a center line (A2), that is a straight line passing through the geometric center of a section of the idle gasket, a concave opening (12) being found between two opposing clearance surfaces (16) each having a projecting part (15) whose summit is designed to come into leaktight contact with an object (8) under a determined preload, characterized such that when idle the projecting parts (15) are slightly offset on the same side opposite to said opening with respect to the center line (A2), such that they come closer to this center line under the effect of preload.

2. Gasket according to claim 1, characterized such that the projecting parts (15) are equidistant from the opening (12).

3. Gasket according to claim 1, characterized such that the two clearance surfaces (16) are each perpendicular to the axis of symmetry (A5) of the projecting part (15) related to them.

4. Gasket according to claim 3, characterized such that the axis of symmetry (A5) passes through the center of the circle defined by the section of the gasket (10).

5. Gasket according to claim 4, characterized such that the summit of each projecting part (15), which is triangular in shape, and an extremity (19) of each clearance surface (16) found closest to the opening (12), define a sealing surface, each clearance surface (16) is inclined by an angle $\alpha$ of inclination determined with respect to the sealing surface, $\alpha$ falling between 1 and 12°, this determined angle of inclination $\alpha$ tending to disappear under the effect of preload.

6. Gasket according to claim 1, characterized such that it is ring-shaped.

7. Gasket according to claim 1, characterized such that a height (h) of the projecting parts (15) falls between 0.05 mm and 0.50 mm.

8. Gasket according to claim 1, characterized such that each projecting part is generally triangular in shape.

9. Gasket according to claim 1, characterized such that each projecting part is generally trapezoidal in shape.

10. Gasket according to claim 1, characterized such that each projecting part is generally elliptical in shape.

11. Gasket according to claim 1, characterized such that each projecting part is generally rectangular in shape.

12. Gasket according to claim 1, characterized such that the gasket is ellipse-shaped.

13. Gasket according to claim 1, characterized such that the gasket is triangle-shaped.

14. Gasket according to claim 1, characterized such that the gasket is rectangle-shaped.

* * * * *